(12) United States Patent
Uenishi et al.

(10) Patent No.: US 12,411,475 B2
(45) Date of Patent: Sep. 9, 2025

(54) NUMERICAL CONTROL DEVICE AND CONTROL METHOD

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 421 days.

(21) Appl. No.: 17/997,746

(22) PCT Filed: May 10, 2021

(86) PCT No.: PCT/JP2021/017706
§ 371 (c)(1),
(2) Date: Nov. 2, 2022

(87) PCT Pub. No.: WO2021/230202
PCT Pub. Date: Nov. 18, 2021

(65) Prior Publication Data
US 2023/0350384 A1    Nov. 2, 2023

(30) Foreign Application Priority Data

May 15, 2020  (JP) .................... 2020-085902
Sep. 10, 2020  (JP) .................... 2020-151880

(51) Int. Cl.
*G05B 19/4155*   (2006.01)
*G05B 19/402*    (2006.01)

(52) U.S. Cl.
CPC ....... *G05B 19/4155* (2013.01); *G05B 19/402* (2013.01); *G05B 2219/34396* (2013.01)

(58) Field of Classification Search
CPC .............. G05B 19/4155; G05B 19/402; G05B 2219/34396
See application file for complete search history.

(56) References Cited

U.S. PATENT DOCUMENTS

| | | | |
|---|---|---|---|
| 5,005,134 A | | 4/1991 | Nakashima et al. |
| 2014/0114465 A1* | | 4/2014 | Terada ............... G05B 19/4083 700/194 |

(Continued)

FOREIGN PATENT DOCUMENTS

| | | |
|---|---|---|
| CN | 101339438 A | 1/2009 |
| CN | 104076736 A | 10/2014 |

(Continued)

OTHER PUBLICATIONS

International Search Report issued in PCT/JP2021/017706; mailed Jul. 20, 2021.

*Primary Examiner* — Christopher E. Everett
(74) *Attorney, Agent, or Firm* — Studebaker Brackett PLLC

(57) ABSTRACT

Provided are: a numerical control device with which it is possible to easily perform a cutting process; a control method; and a processing program. The numerical control device comprises: a processing program analysis unit that analyzes commands that a machine tool can perform simultaneously, from one line of the processing program for commanding the machine tool before and after the cutting process; and a simultaneous operation control unit that uses the analyzed commands that can be performed simultaneously, combines the operations that the machine tool can perform simultaneously, and controls the commanded simultaneous operations.

7 Claims, 19 Drawing Sheets

(56) References Cited

U.S. PATENT DOCUMENTS

| | | | | |
|---|---|---|---|---|
| 2015/0134105 A1* | 5/2015 | Iuchi | .................. | G05B 19/4155 |
| | | | | 700/186 |
| 2015/0227130 A1* | 8/2015 | Terada | .................... | B23B 3/162 |
| | | | | 700/186 |
| 2016/0282852 A1* | 9/2016 | Endou | ................ | G05B 19/4155 |
| 2017/0308060 A1* | 10/2017 | Matsubara | ........... | G05B 19/402 |
| 2018/0246498 A1* | 8/2018 | Ono | .................. | G05B 19/4155 |

FOREIGN PATENT DOCUMENTS

| | | | |
|---|---|---|---|
| CN | 109213084 | A | 1/2019 |
| JP | H08-249028 | A | 9/1996 |
| JP | 2009-193209 | A | 8/2009 |
| JP | 2012-141762 | A | 7/2012 |
| JP | 2018-142194 | A | 9/2018 |
| JP | 2019-070953 | A | 5/2019 |
| WO | 2012/105028 | A1 | 8/2012 |
| WO | 2013/118241 | A1 | 8/2013 |
| WO | 2014/038101 | A1 | 3/2014 |

* cited by examiner

FIG. 3

| P1 | P2 |
|---|---|
| O0001 | PROGRAM NAME |
| G920 T01 H01 G54 X0 Y0 Z50. A90. C45. S1000 M03 M08 M100  *(P11)* | TOOL REPLACEMENT Z-POSITION OPERATION & A- AND C-AXES UNCLAMPING & SPINDLE STOP →TOOL REPLACEMENT & WORKPIECE COORDINATE SYSTEM SETTING & X-, Y-, A-, AND C-AXES MOVEMENT →A- AND C-AXES CLAMPING & SPINDLE ROTATION & TOOL LENGTH CORRECTION & CUTTING FLUID ON |
| G99 G81 Z-20. R5. F300 | FIXED CYCLE START |
| X10. Y10. | DRILLING POSITION |
| G930 X0 Y0 Z0 A0 C0 M05 M09 M101  *(P12)* | FIXED CYCLE CANCELLATION & CUTTING FLUID OFF & Z-AXIS HOMING A- AND C-AXES UNCLAMPING & SPINDLE STOP & TOOL LENGTH CORRECTION CANCELLATION →X-, Y-, A-, AND C-AXES HOMING |
| M30 | PROGRAM END |

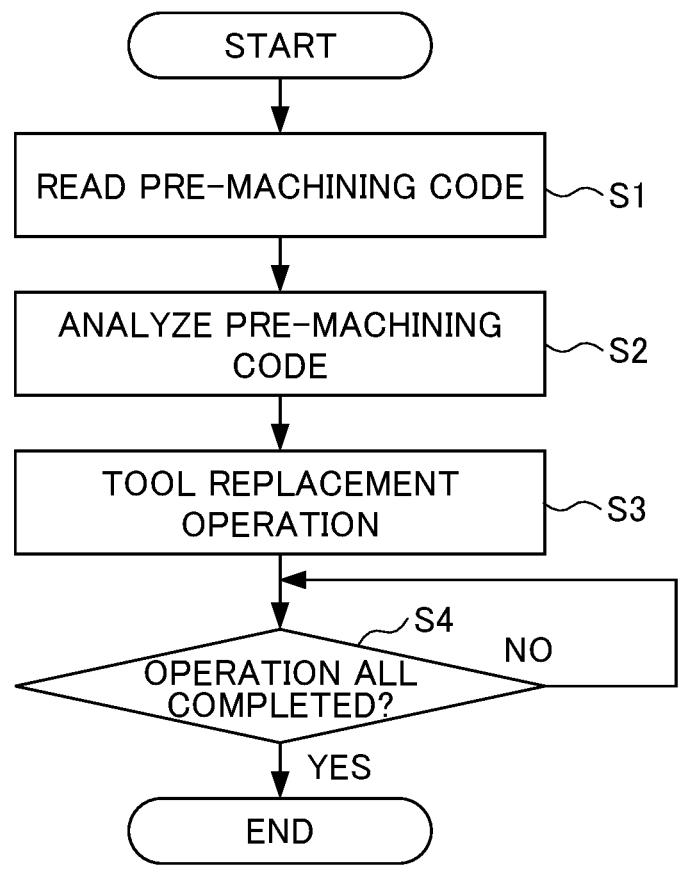

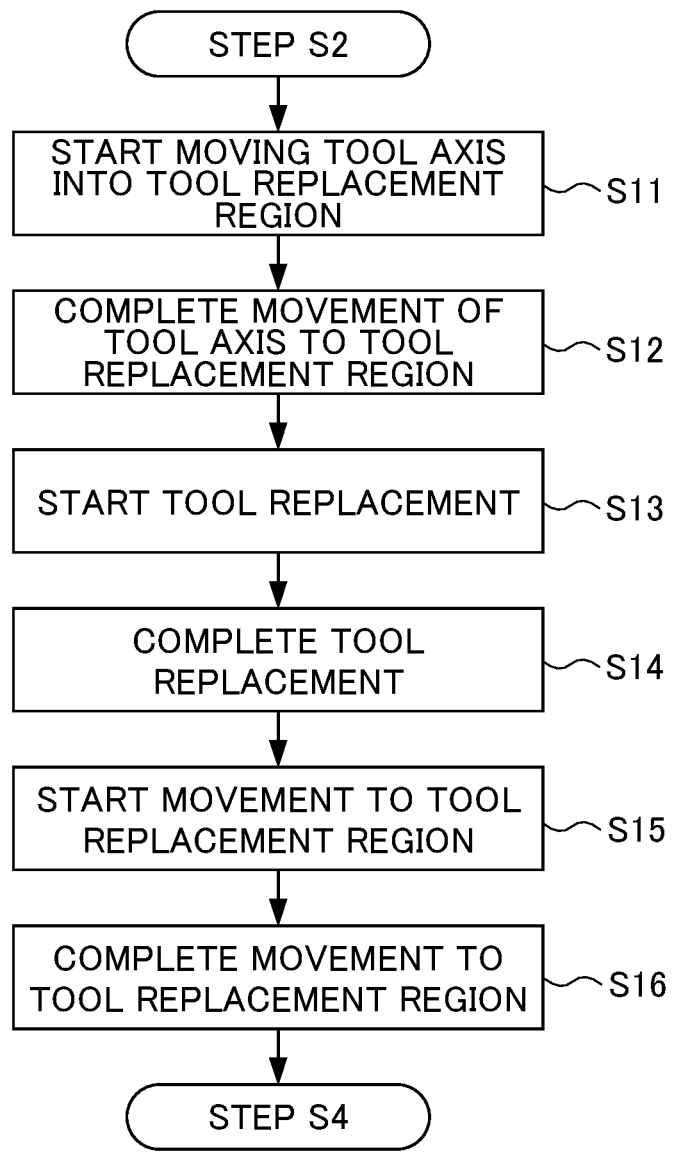

FIG. 18

| | TOOL SYSTEM COMMAND | |
|---|---|---|
| | CODE | COMMAND |
| BEFORE REPLACEMENT | M05 | ROTATION STOP |
| | M18 | TOUCH-TRIGGER PROBE OFF |
| | M19 | SPINDLE ORIENTATION |
| | G49 | TOOL LENGTH CORRECTION CANCELLATION |
| | G80 | FIXED CYCLE CANCELLATION |
| DURING REPLACEMENT | T | TOOL NUMBER |
| AFTER REPLACEMENT | M03,M04,M29 | FORWARD ROTATION, BACKWARD ROTATION, RIGID |
| | S_ | SPINDLE ROTATION COMMAND |
| | M17 | TOUCH-TRIGGER PROBE ON |
| | G43 | TOOL LENGTH CORRECTION |
| | H-NUMBER COMMAND | TOOL LENGTH CORRECTION NUMBER |
| | G90,G91 | MOVEMENT MANAGEMENT COORDINATE SYSTEM |
| | Z_ | TOOL AXIS MOVEMENT COMMAND |
| | AXIAL SYSTEM COMMAND | |
| BEFORE MOVEMENT | M11,M69,M72 | ROTATION AXIS UNCLAMPING |
| | G40 | TOOL DIAMETER CORRECTION CANCELLATION |
| | G69 | COORDINATE ROTATION CANCELLATION |
| DURING MOVEMENT | X_Y_A_B_C_ | AXIS MOVEMENT COMMAND |
| | G54~G59 | WORKPIECE COORDINATE SYSTEM |
| | G90,G91 | MOVEMENT MANAGEMENT COORDINATE SYSTEM |
| | G28,G30 | HOMING |
| | G41,G42 | TOOL DIAMETER CORRECTION |
| | D-NUMBER COMMAND | TOOL DIAMETER CORRECTION NUMBER |
| AFTER MOVEMENT | M71,M72 | ROTATION AXIS CLAMPING |
| | PERIPHERAL DEVICE COMMAND | |
| BEFORE REPLACEMENT | M09 | CUTTING FLUID AND AIR BLOWER OFF |
| DURING REPLACEMENT | M26 | TAPERED SURFACE CLEANING |
| AFTER REPLACEMENT | M07 | AIR BLOWER ON |
| | M08 | CUTTING FLUID ON |
| | M22 | CENTER-THROUGH ON |

FIG. 19

| | TOOL SYSTEM COMMAND | |
|---|---|---|
| | CODE | COMMAND |
| BEFORE REPLACEMENT | M05 | ROTATION STOP |
| | M18 | TOUCH-TRIGGER PROBE OFF |
| | M19 | SPINDLE ORIENTATION |
| | G49 | TOOL LENGTH CORRECTION CANCELLATION |
| | G80 | FIXED CYCLE CANCELLATION |
| DURING REPLACEMENT | T | TOOL NUMBER |
| AFTER REPLACEMENT | | |
| | AXIAL SYSTEM COMMAND | |
| BEFORE MOVEMENT | M11,M69,M72 | ROTATION AXIS CLAMPING |
| | G40 | TOOL DIAMETER CORRECTION CANCELLATION |
| | G69 | COORDINATE ROTATION CANCELLATION |
| DURING MOVEMENT | X_Y_A_B_C_ | AXIS MOVEMENT COMMAND |
| | G54~G59 | WORKPIECE COORDINATE SYSTEM |
| | G90,G91 | MOVEMENT MANAGEMENT COORDINATE SYSTEM |
| | G28,G30 | HOMING |
| AFTER MOVEMENT | | |
| | PERIPHERAL DEVICE COMMAND | |
| BEFORE REPLACEMENT | M09 | CUTTING FLUID AND AIR BLOWER OFF |
| DURING REPLACEMENT | M26 | TAPERED SURFACE CLEANING |
| AFTER REPLACEMENT | | |

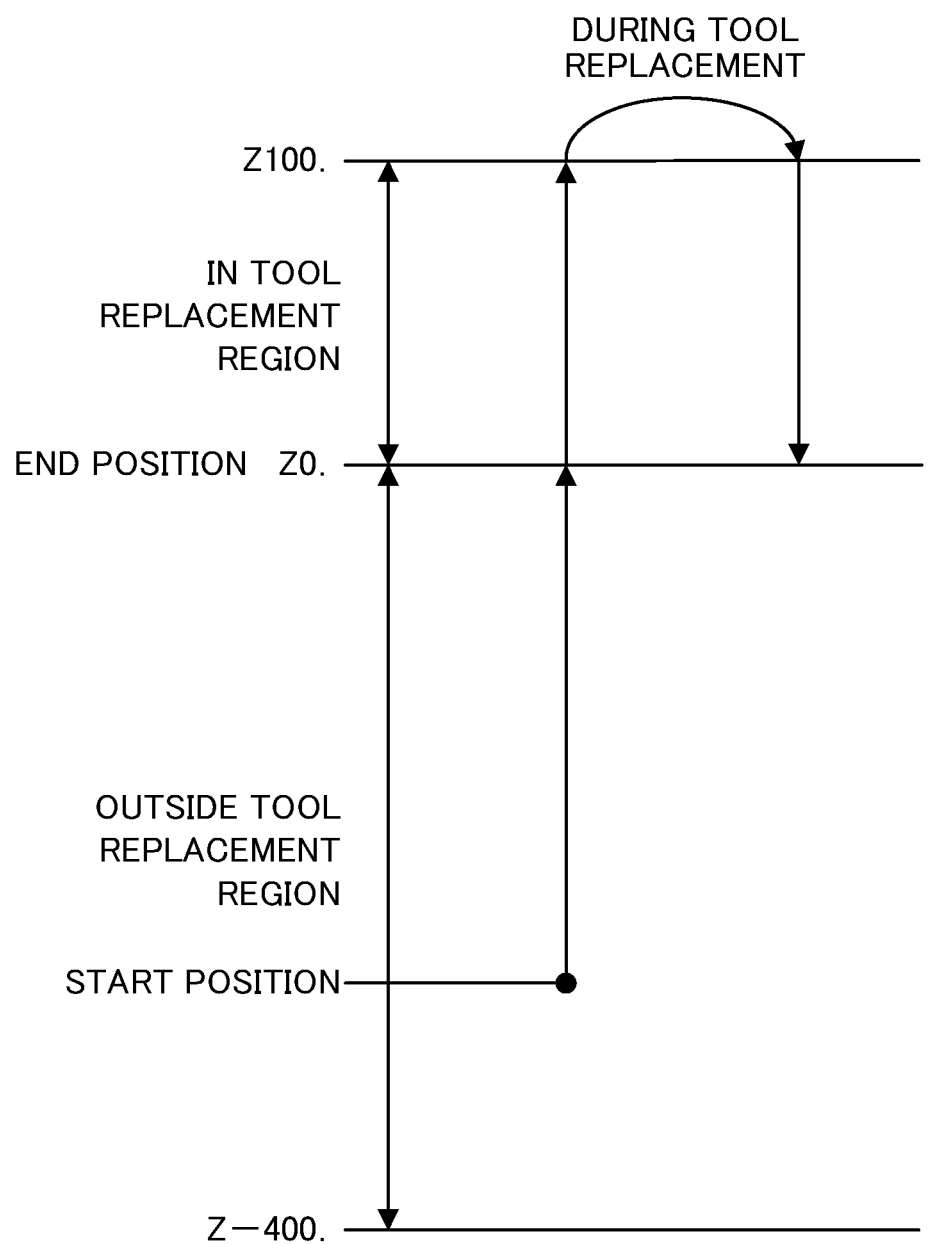

NUMERICAL CONTROL DEVICE AND CONTROL METHOD

TECHNICAL FIELD

The present invention relates to a numerical control device and a control method thereof.

BACKGROUND ART

Typically, a numerical control device that controls, e.g., a machine tool executes, e.g., workpiece machining by a machining program (see, e.g., Patent Document 1). A machining program processing device described in Patent Document 1 calculates a correction reference point based on a tool tip point command position and a tool posture command angle commanded by the machining program, and rewrites the tool tip point command position with the position of the correction reference point.

Patent Document 1: Japanese Unexamined Patent Application, Publication No. 2019-70953

DISCLOSURE OF THE INVENTION

Problems to be Solved by the Invention

The numerical control device uses the machining program for workpiece cutting. Machining cannot be performed only by commanding of cutting conditions by the machining program. For this reason, various types of correction of, e.g., attachment of a tool and a coordinate system number associated with a tool length, a workpiece position, etc. need to be commanded before and after the program for performing operation under the commanded cutting conditions. However, although it is possible to perform cutting by commanding the necessary correction, this does not always result in efficient operation. For example, tool replacement and workpiece movement can be simultaneously commanded by a one-line program, and tool length correction and spindle rotation can also be simultaneously commanded by a one-line program in many cases. A worker who does not know that a machine tool can be simultaneously commanded will run an inefficient and lengthy machining program by commanding on different lines. For this reason, there has been a demand for easy and efficient execution of operation of the machine tool.

Means for Solving the Problems

A numerical control device according to the present disclosure includes a machining program analysis unit that analyzes commands simultaneously executable by a machine tool from a one-line machining program for commanding the machine tool before and after cutting, and a simultaneous operation control unit that uses the analyzed simultaneously-executable commands to control simultaneous operation commanded according to a combination of the commands simultaneously executable by the machine tool. The method for controlling a numerical control device according to the present disclosure includes the step of analyzing commands simultaneously executable by a machine tool from a one-line machining program for commanding the machine tool before and after cutting, and the step of using the analyzed simultaneously-executable commands to control simultaneous operation commanded according to a combination of the commands simultaneously executable by the machine tool.

Effects of the Invention

According to the present invention, operation of the machine tool can be easily and efficiently executed.

BRIEF DESCRIPTION OF THE DRAWINGS

FIG. 3 is a view showing a specific example of a machining program;

FIG. 4 is a flowchart showing the processing of a pre-machining code;

FIG. 5 is a flowchart showing processing regarding a tool axis;

FIG. 18 is a command classification table for the pre-machining code;

FIG. 19 is a command classification table for the post-machining code;

FIG. 21 is an example of tool axis movement according to a certain post-machining code P12.

PREFERRED MODE FOR CARRYING OUT THE INVENTION

Figure 1:
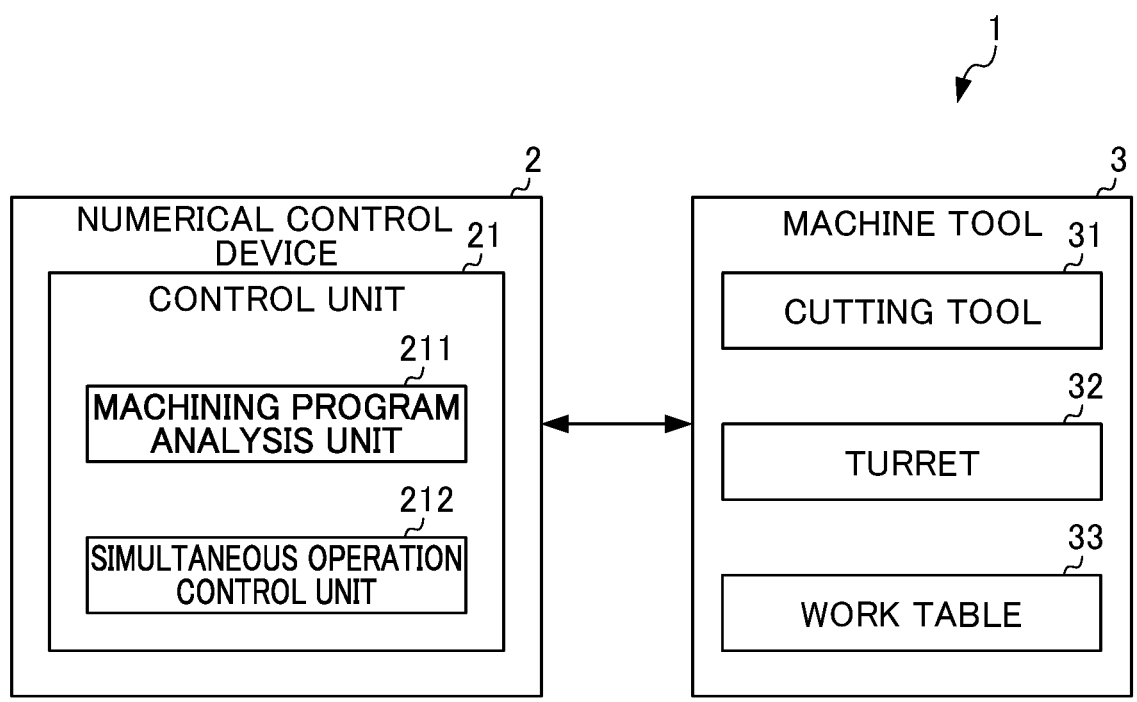
FIG. 1 is a diagram showing the configuration of a machining system.

Hereinafter, an embodiment of the present invention will be described as one example. FIG. 1 is a diagram showing the configuration of a machining system 1. As shown in FIG. 1, the machining system 1 includes a numerical control device 2 and a machine tool 3.

The numerical control device 2 is a device that controls the machine tool 3 to perform, e.g., predetermined machining. The numerical control device 2 includes a control unit 21. The control unit 21 is a processor such as a central processing unit (CPU), and functions as a machining program analysis unit 211 and a simultaneous operation control unit 212 by executing programs stored in a storage unit (not shown).

Figure 2:
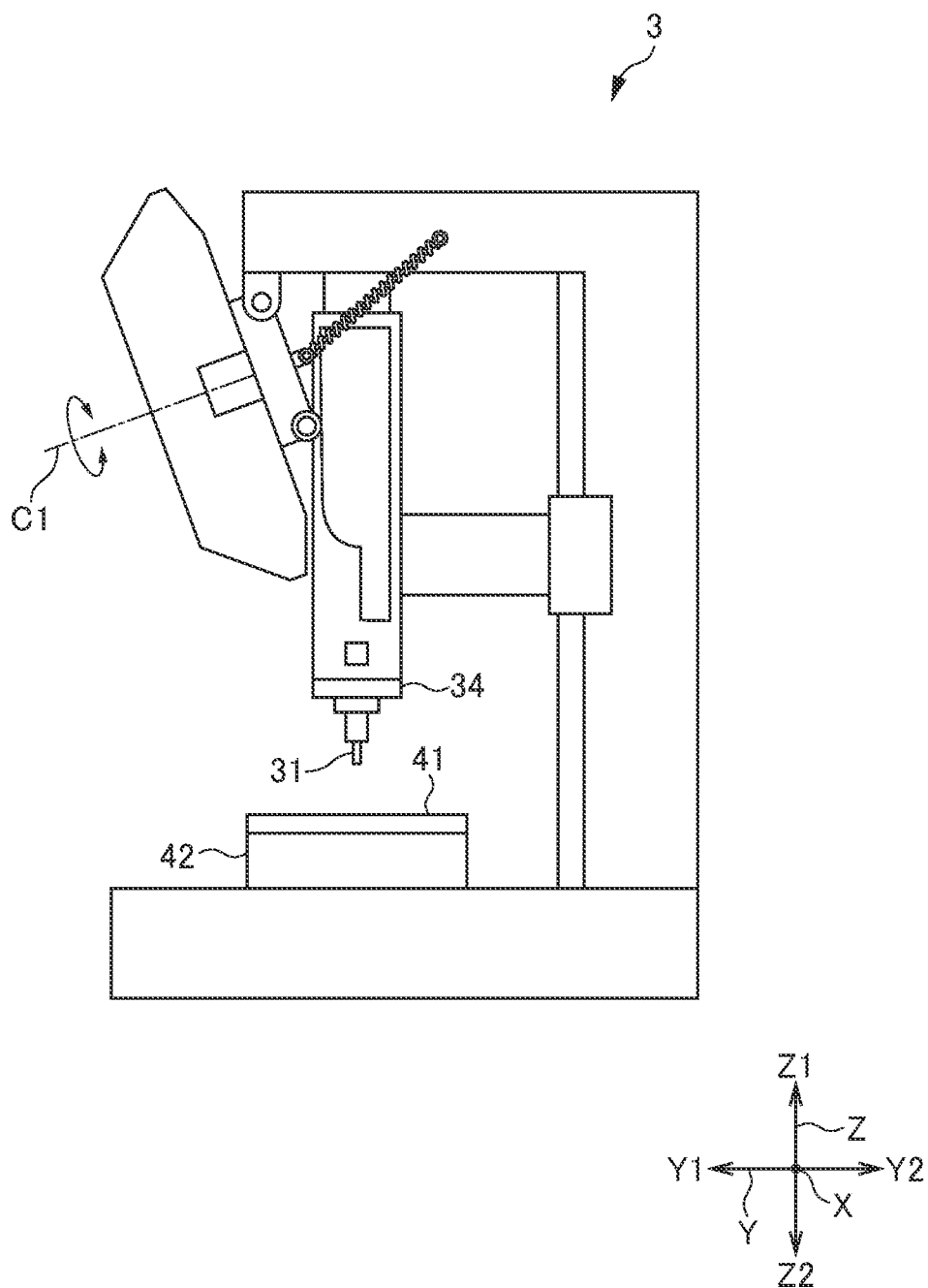
FIG. 2 is a view showing the outline of a machine tool.

The machine tool 3 is a device that performs the predetermined machining such as cutting, tool measurement, etc. based on control by the numerical control device 2. FIG. 2 is a view showing the outline of the machine tool 3.

The machine tool 3 includes, for example, a motor driven to machine a workpiece 41, a spindle and a feed shaft attached to the motor, a jig and a tool for each of these shafts, and a table 42 for fixing the workpiece 41. The machine tool 3 drives the motor based on an operation command output from the numerical control device 2, thereby performing the predetermined machining. Specifically, the machine tool 3 includes a cutting tool 31, a turret 32, the table 42.

Plural types of cutting tools 31 are prepared according to a purpose for machining. Each cutting tool 31 is replaced while being attached to a dedicated tool holder. A specific tool number is assigned to each cutting tool 31.

The turret 32 is a substantially discoid structure provided with a plurality of grips at an outer periphery. The turret 32 turns about a rotation axis Cl at a turning position shown in FIG. 2. The turret 32 turns to move the cutting tool 31 to a position facing the spindle 34.

A work table 33 is a mechanism that movably supports the workpiece 41 in a right-left direction (an X-direction) and a front-back direction (a Y-direction). An X-axis motor, a Y-axis motor, an encoder, etc. (all not shown) are provided at the work table 33. The machine tool 3 of the present embodiment moves the tool 31 held by the spindle 34 in an up-down direction (a Z-direction) while moving the workpiece 41 in the X-direction and the Y-direction, thereby machining the workpiece 41.

Next, operation of the numerical control device 2 will be described. The machining program analysis unit 211 analyzes commands simultaneously executable by the machine tool 3 from a one-line machining program for commanding the machine tool 3 before and after cutting. Using the analyzed simultaneously-executable commands, the simultaneous operation control unit 212 controls simultaneous operation commanded according to a combination of the commands simultaneously executable by the machine tool.

The machining program described herein includes, as pre-machining codes before cutting, a tool number for replacement of the cutting tool 31; a tool correction number for tool length and diameter correction; settings of a workpiece coordinate system and a movement management coordinate system; movement axis and speed of the cutting tool 31, the workpiece 41, or the table 42 in the coordinate system; a spindle rotation number and spindle control; rotation axis clamping and unclamping; cutting fluid control, tapered surface cleaning control, and center-through control; and measuring machine control.

Further, the machining program includes, as post-machining codes after cutting, homing; a homing axis and a movement speed; settings of the coordinate system and the movement management coordinate system; a tool number for replacement of the cutting tool 31; rotation axis clamping and unclamping; and the spindle control and the cutting fluid control.

FIG. 3 is a view showing a specific example of the machining program. The example of the machining program shown in FIG. 3 includes a machining program P1 and machining program operation description P2. The machining program P1 includes a pre-machining code P11 and a post-machining code P12.

Figure 11:
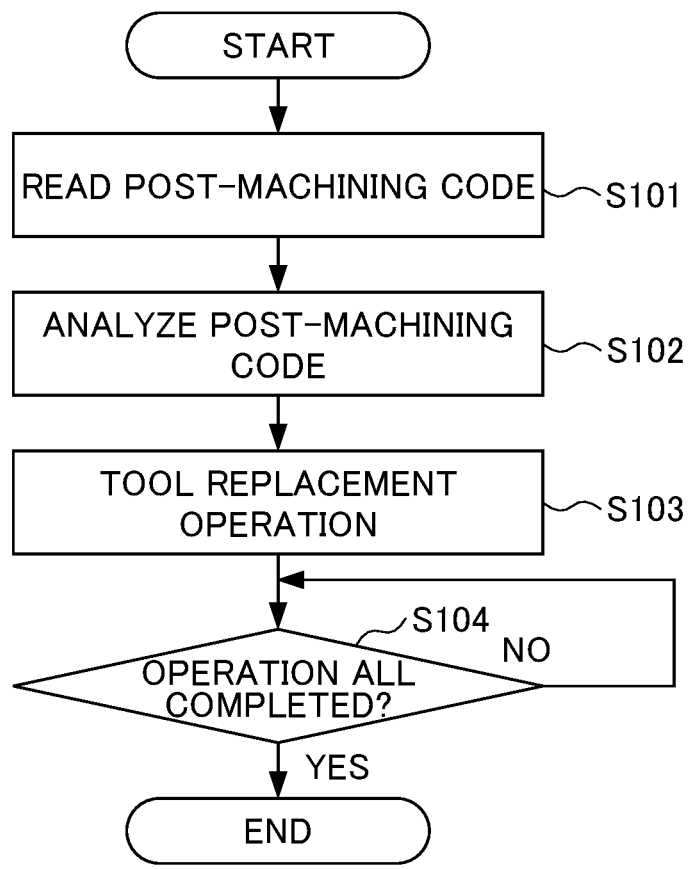
FIG. 11 is a flowchart showing the processing of a post-machining code P12.

FIG. 4 is a flowchart showing the processing of the pre-machining code P11, and FIG. 11 is a flowchart showing the processing of the post-machining code P12. The machining program analysis unit 211 analyzes corresponding commands according to later-described command classification tables shown in FIGS. 18 and 19 from the machining program P1 including the commands of the pre-machining code P11 and the post-machining code P12. The simultaneous operation control unit 212 controls the simultaneous operation according to the flowchart of FIG. 4 or 11.

In Step S1 of FIG. 4, the machining program analysis unit 211 reads the pre-machining code P11 of the machining program from the storage unit (not shown). In Step S2, the machining program analysis unit 211 analyzes corresponding commands according to the command classification table shown in FIG. 18 from the commands of the pre-machining code P11. Note that the command classification table will be described in detail later.

In Step S3, the simultaneous operation control unit 212 executes tool replacement operation. The tool replacement operation in Step S3 will be described later.

The outside of a tool replacement region in Step S3 indicates a tool position outside a region defined as the tool replacement region. For example, in a state immediately after completion of drilling, a tool tip end is at an R-point. In the case of a turret-type machining center, such a tool tip end is at a position apart from a tool replacement start position.

The inside of the tool replacement region indicates a region in which a tool axis moves until completion after the start of the tool replacement operation. For example, in the case of the turret-type machining center, the inside of the tool replacement region indicates a region in which the tool moves out of the spindle in a Z+ direction from Z0. Moreover, the inside of the tool replacement region indicates, in the case of tool replacement for the turret-type machining center, a period until a spindle holds a tool by rotation of a turret and a grip of the turret moves apart from a holder after the grip has held the tool.

In Step S4, the control unit 21 determines whether or not all types of operation have been completed. In a case where all types of operation have been completed (YES), the processing ends thereafter. In a case where all types of operation have not been completed (NO), the processing in Step S4 is repeated again.

FIGS. 5 to 10 are flowcharts showing specific processing of the tool replacement operation. FIG. 5 is a flowchart showing the processing for the tool axis.

In Step S11 of FIG. 5 after Step S2 of FIG. 4, the simultaneous operation control unit 212 starts moving the tool axis into the tool replacement region for starting the tool replacement operation. In Step S12, the simultaneous operation control unit 212 completes movement of the tool axis into the tool replacement region.

In Step S13, the simultaneous operation control unit 212 starts tool replacement based on a tool number of a replacement tool system command. In Step S14, the simultaneous operation control unit 212 completes tool replacement.

In Step S15, the simultaneous operation control unit 212 starts moving the tool axis into the tool replacement region. In Step S16, the simultaneous operation control unit 212 completes movement of the tool axis into the tool replacement region, and the processing subsequently proceeds to Step S4 of FIG. 4.

Figure 6:
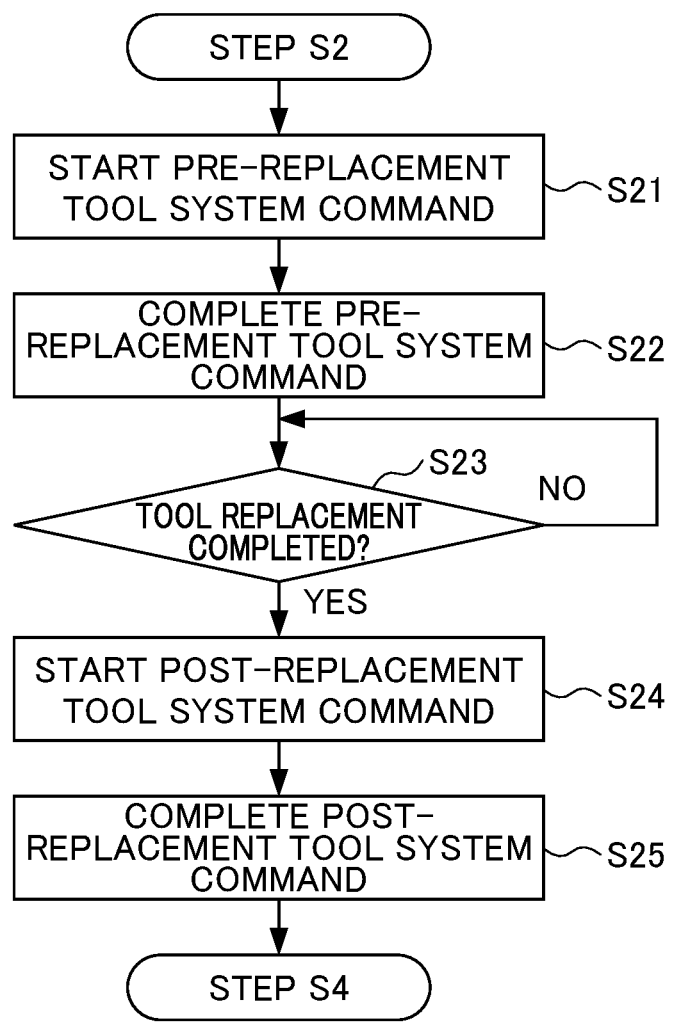
FIG. 6 is a flowchart showing processing regarding a tool system command.

FIG. 6 is a flowchart showing the processing for a tool system command. In Step S21 of FIG. 6 after Step S2 of FIG. 4, the simultaneous operation control unit 212 starts a pre-replacement tool system command. Specifically, the pre-replacement tool system command includes a command of a cancellation code of each function regarding a spindle orientation and the tool axis.

In Step S22, the simultaneous operation control unit 212 completes the pre-replacement tool system command. In Step S23, the simultaneous operation control unit 212 determines whether or not tool replacement has been completed. In a case where tool replacement has been completed (YES), the processing proceeds to Step S24. In a case where tool replacement has not been completed (NO), the processing in Step S23 is repeated again.

In Step S24, the simultaneous operation control unit 212 starts a post-replacement tool system command. Specifically, the post-replacement tool system command includes commands such as a spindle rotation number, the spindle or touch-trigger probe control, tool length correction, a tool length correction number setting, the movement management coordinate system, and a tool axis movement command. In Step S25, the simultaneous operation control unit 212 completes the post-replacement tool system command, and the processing subsequently proceeds to Step S4 of FIG. 4.

Figure 7:
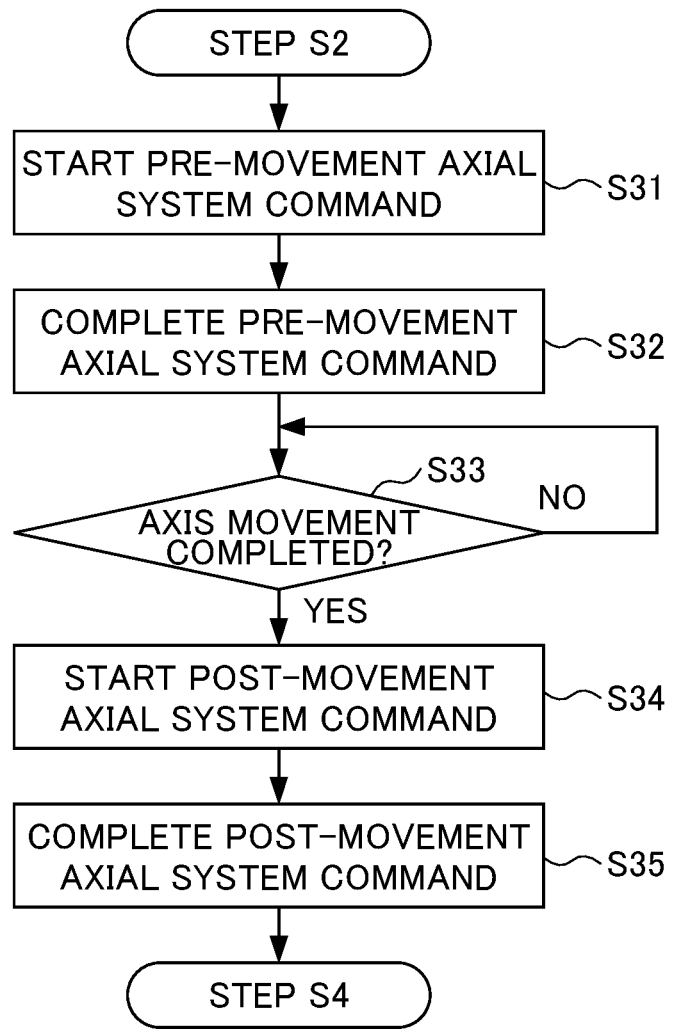
FIG. 7 is a flowchart showing processing regarding an axial system command.

FIG. 7 is a flowchart showing the processing for an axial system command. In Step S31 of FIG. 7 after Step S2 of FIG. 4, the simultaneous operation control unit 212 starts a pre-movement axial system command. Specifically, the simultaneous operation control unit 212 starts, as the pre-movement axial system command, a cancellation code of each function regarding rotation axis unclamping and axis movement.

In Step S32, the simultaneous operation control unit 212 completes the pre-movement axial system command. In Step S33, the simultaneous operation control unit 212 determines whether or not axis movement according to a later-described movement axial system command started in Step S42 shown in FIG. 8 has been completed. In a case where axis movement has been completed (YES), the processing proceeds to Step S34. In a case where axis movement has not been completed (NO), the processing in Step S33 is repeated again.

In Step S34, the simultaneous operation control unit 212 starts a post-movement axial system command. Specifically, the post-movement axial system command includes commands such as rotation axis clamping. In Step S35, the simultaneous operation control unit 212 completes the post-movement axial system command, and the processing subsequently proceeds to Step S4 of FIG. 4.

Figure 8:
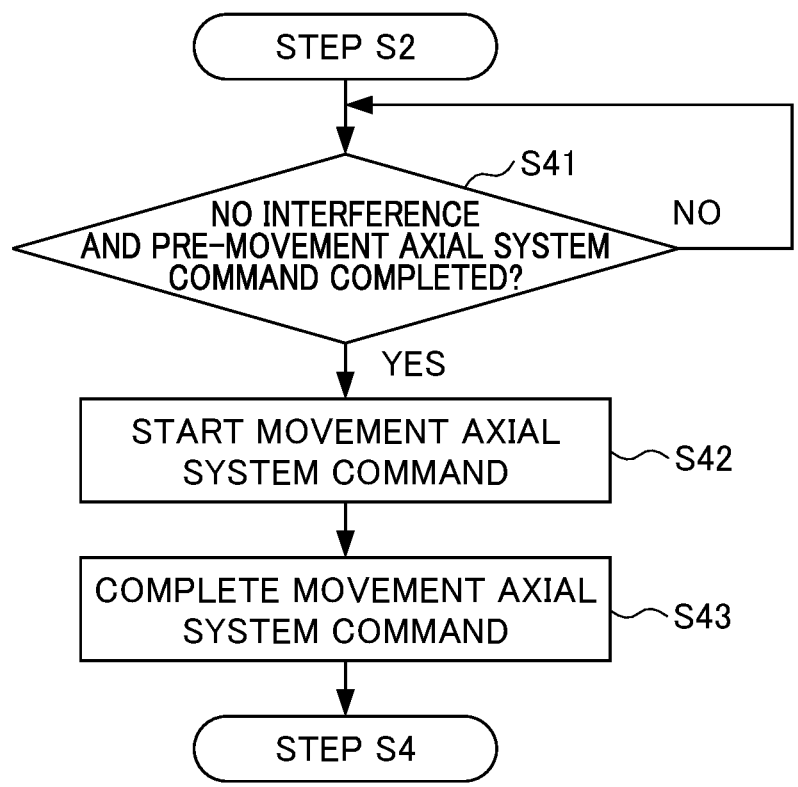
FIG. 8 is a flowchart showing processing regarding a movement axial system.

FIG. 8 is a flowchart showing the processing for a movement axial system. In Step S41 of FIG. 8 after Step S2 of FIG. 4, the simultaneous operation control unit 212 causes the processing to proceed to Step S42 in a case where there is no interference and a pre-movement axial system command has been completed (YES). In a case where there is an interference or the pre-movement axial system command has not been completed (NO), the processing in Step S41 is repeated.

In Step S42, the simultaneous operation control unit 212 starts a movement axial system command. Specifically, the movement axial system command includes commands such as an axis movement command, the workpiece coordinate system, the movement management coordinate system, and a tool diameter correction number.

In Step S43, the simultaneous operation control unit 212 completes the movement axial system command, and the processing subsequently proceeds to Step S4 of FIG. 4.

Figure 9:
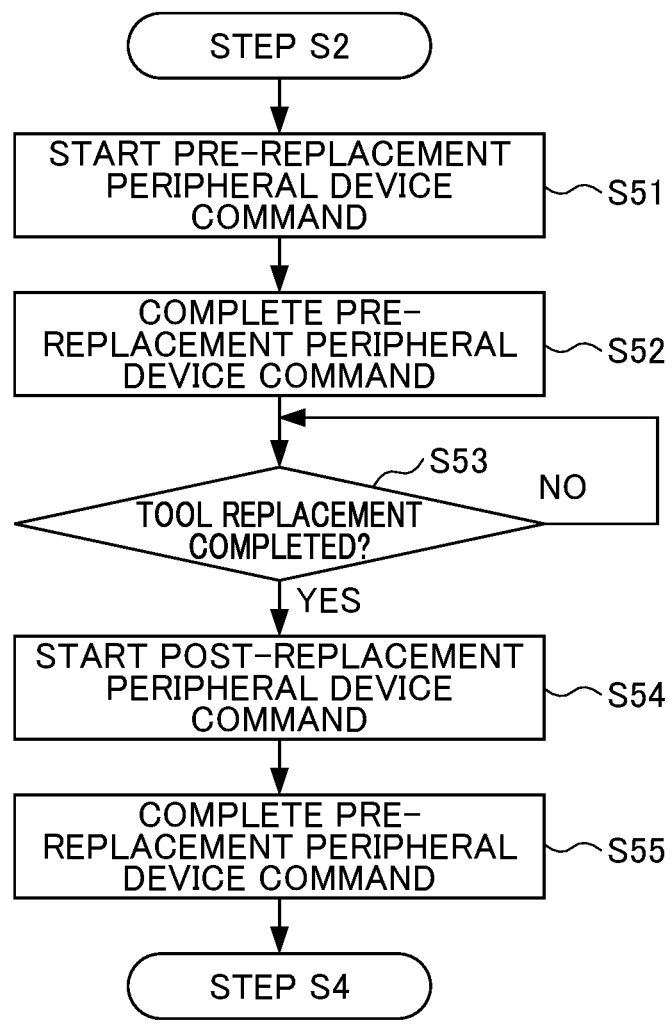
FIG. 9 is a flowchart showing processing regarding a peripheral device.

FIG. 9 is a flowchart showing the processing for a peripheral device. In Step S51 of FIG. 9 after Step S2 of FIG. 4, the simultaneous operation control unit 212 starts a pre-replacement peripheral device command. Specifically, the simultaneous operation control unit 212 starts, as the peripheral device command, processing a cutting fluid OFF command and an air blower OFF command.

In Step S52, the simultaneous operation control unit 212 completes the pre-replacement peripheral device command. In Step S53, the simultaneous operation control unit 212 determines whether or not tool replacement has been completed. In a case where tool replacement has been completed (YES), the processing proceeds to Step S54. In a case where tool replacement has not been completed (NO), the processing in Step S53 is repeated.

In Step S54, the simultaneous operation control unit 212 starts a post-replacement peripheral device command. Specifically, the simultaneous operation control unit 212 starts, as the post-replacement peripheral device command, the cutting fluid control. Specifically, the simultaneous operation control unit 212 starts a cutting fluid ON command, an air blower ON command, and a center-through ON command. In Step S55, the simultaneous operation control unit 212 completes the post-replacement peripheral device command, and the processing subsequently proceeds to Step S4 of FIG. 4.

Figure 10:
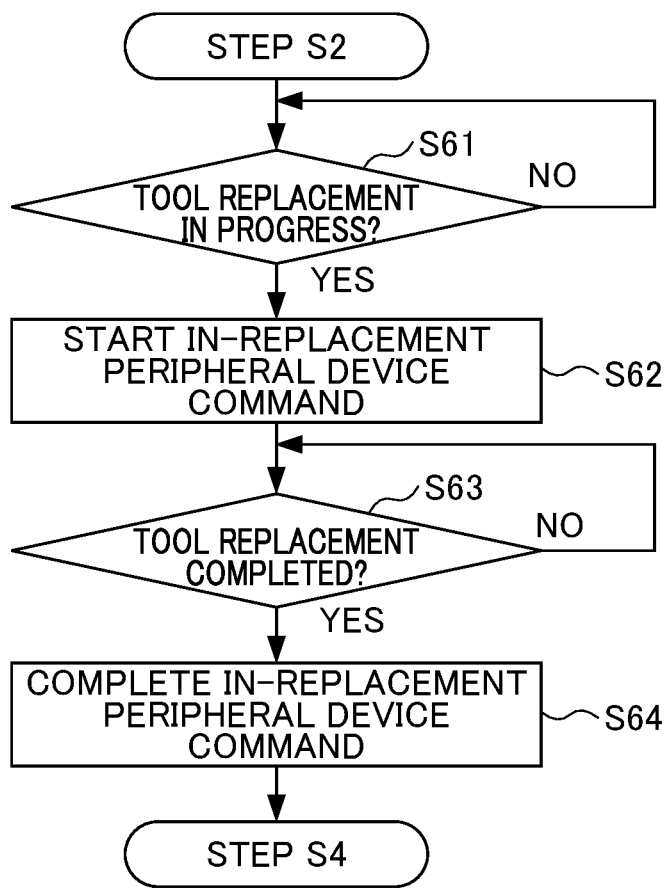
FIG. 10 is a flowchart showing processing regarding a peripheral device.

FIG. 10 is a flowchart showing the processing for a peripheral device. In Step S61 of FIG. 10 after Step S2 of FIG. 4, the simultaneous operation control unit 212 determines whether or not tool replacement is in progress. In a case where tool replacement is in progress (YES), the processing proceeds to Step S62. In a case where tool replacement is not in progress (NO), the processing in Step S61 is repeated.

In Step S62, the simultaneous operation control unit 212 starts an in-replacement peripheral device command. Specifically, the simultaneous operation control unit 212 starts, as the peripheral device command, processing a tapered surface cleaning command for cleaning tapered surfaces of the spindle and the tool. In Step S63, the simultaneous operation control unit 212 determines whether or not tool replacement has been completed. In a case where tool replacement has been completed (YES), the processing proceeds to Step S64. In a case where tool replacement has not been completed (NO), the processing in Step S63 is repeated again.

In Step S64, the simultaneous operation control unit 212 completes the in-replacement peripheral device command, and the processing subsequently proceeds to Step S4 of FIG. 4.

FIG. 11 is a flowchart showing the processing of the post-machining code P12. In Step S101 of FIG. 11, the machining program analysis unit 211 reads the post-machining code P12 of the machining program from the storage unit (not shown).

In Step S102, the machining program analysis unit 211 analyzes corresponding commands according to the command classification table shown in FIG. 19 from the commands of the post-machining code P12. Note that the command classification table will be described in detail later.

In Step S103, the simultaneous operation control unit 212 executes the tool replacement operation. The tool replacement operation in Step 3103 will be described later. In Step S104, the control unit 21 determines whether or not all types of operation have been completed. In a case where all types of operation have been completed (YES), the processing ends thereafter. In a case where all types of operation have not been completed (NO), the processing in Step S104 is repeated again.

Figure 12:
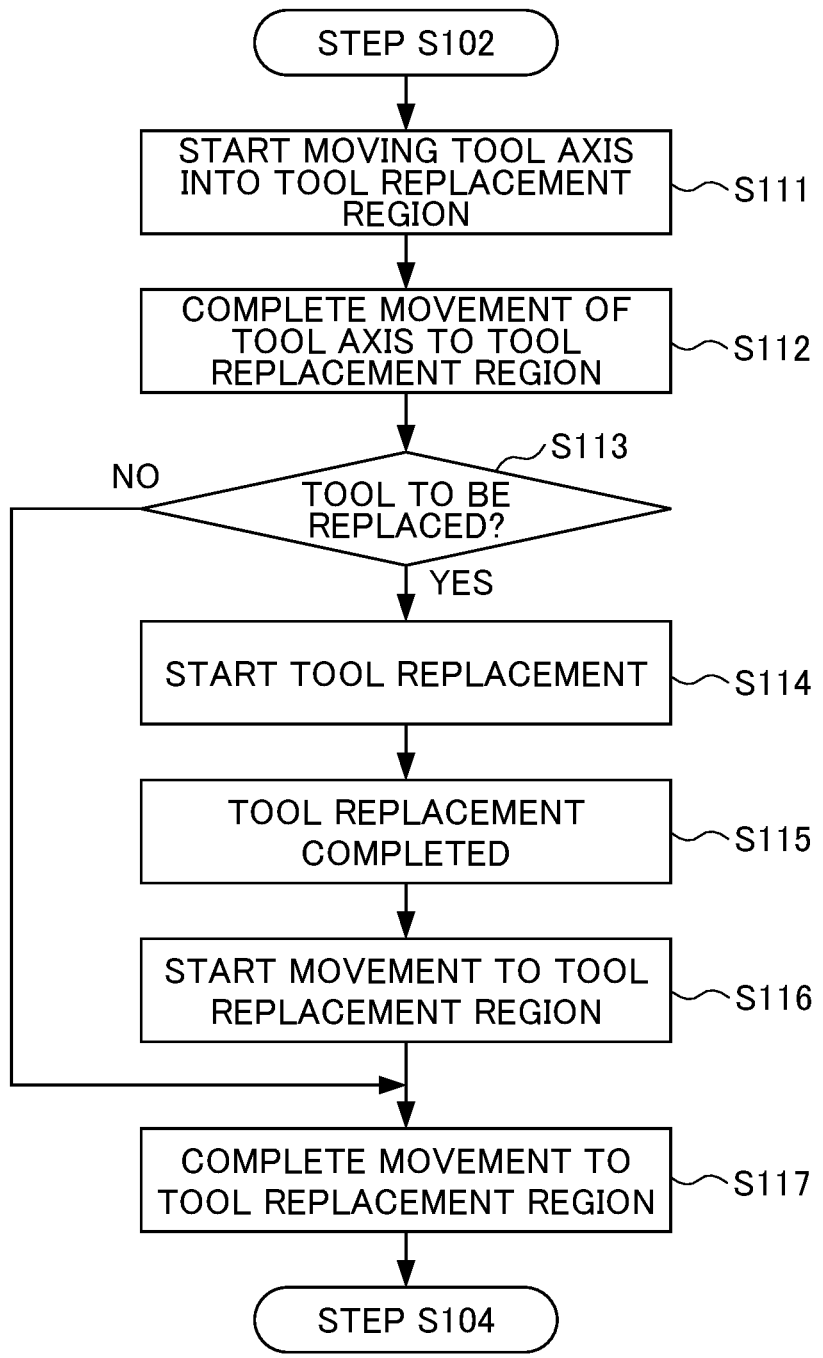
FIG. 12 is a flowchart showing processing regarding a tool axis.

FIGS. 12 to 17 are flowcharts showing specific processing of the tool replacement operation. FIG. 12 is a flowchart showing the processing for the tool axis.

In Step S111 of FIG. 12 after Step S102 of FIG. 11, the simultaneous operation control unit 212 starts moving the tool axis into the tool replacement region for starting the tool replacement operation. In Step S112, the simultaneous operation control unit 212 completes movement of the tool axis into the tool replacement region.

In Step S113, the simultaneous operation control unit 212 determines whether or not a tool number of a replacement tool system command has been commanded, thereby determining whether or not tool replacement is to be performed. In a case where the tool number of the replacement tool system command has been commanded (YES), the processing proceeds to Step S114. In a case where the tool number has not been commanded (NO), the processing proceeds to Step S117.

In Step S114, the simultaneous operation control unit 212 starts tool replacement based on the tool number of the replacement tool system command. In Step S115, the simultaneous operation control unit 212 completes tool replacement.

In Step S116, the simultaneous operation control unit 212 starts moving the tool axis into the tool replacement region.

In Step S117, the simultaneous operation control unit 212 completes movement of the tool axis into the tool replacement region, and the processing subsequently proceeds to Step 3104 of FIG. 11.

Figure 13:
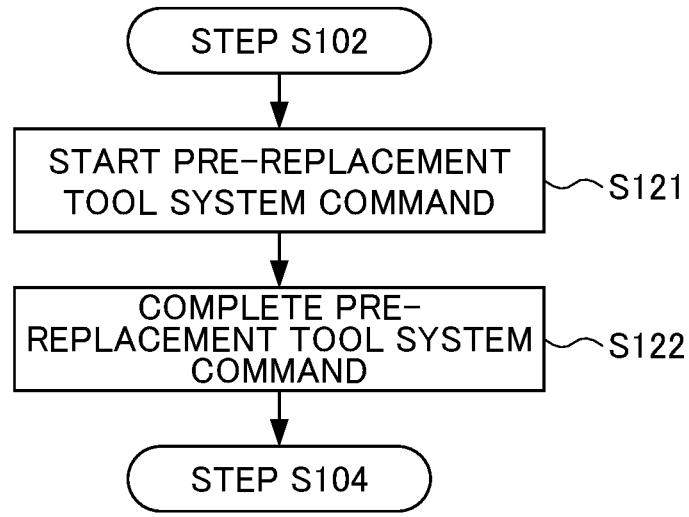
FIG. 13 is a flowchart showing processing regarding a tool system command.

FIG. 13 is a flowchart showing the processing for a tool system command. In Step S121 of FIG. 13 after Step S102 of FIG. 11, the simultaneous operation control unit 212 starts a pre-replacement tool system command. Specifically, the pre-replacement tool system command includes a command of a cancellation code of each function regarding a spindle orientation and the tool axis.

In Step S122, the simultaneous operation control unit 212 completes the pre-replacement tool system command, and the processing subsequently proceeds to Step S104 of FIG. 11.

Figure 14:
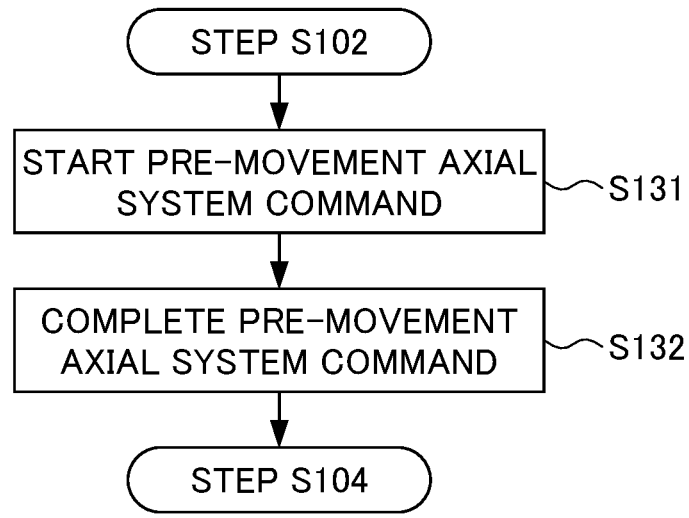
FIG. 14 is a flowchart showing processing regarding an axial system command.

FIG. 14 is a flowchart showing the processing for an axial system command. In Step S131 of FIG. 14 after Step S102 of FIG. 11, the simultaneous operation control unit 212 starts a pre-movement axial system command. Specifically, the simultaneous operation control unit 212 starts, as the pre-movement axial system command, a cancellation code of each function regarding rotation axis unclamping and axis movement. Then, in Step S132, the simultaneous operation control unit 212 completes the pre-movement axial system command, and the processing subsequently proceeds to Step S104 of FIG. 11.

Figure 15:
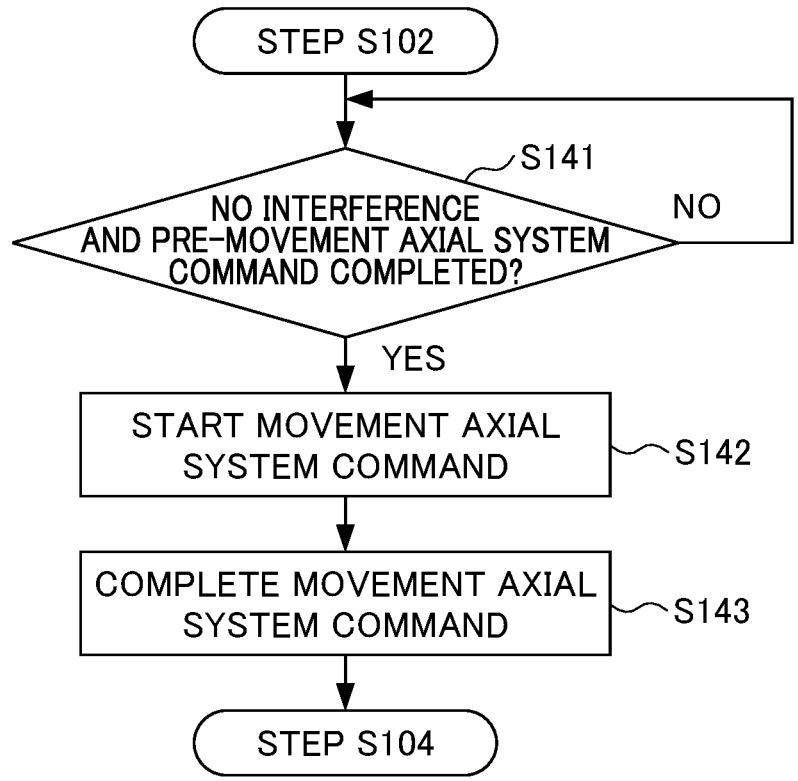
FIG. 15 is a flowchart showing processing regarding a movement axial system.

FIG. 15 is a flowchart showing the processing for a movement axial system. In Step S141 of FIG. 15 after Step S102 of FIG. 11, the simultaneous operation control unit 212 causes the processing to proceed to Step S142 in a case where there is no interference and a pre-movement axial system command has been completed (YES). In a case where there is an interference or the pre-movement axial system command has not been completed (NO), the processing in Step S141 is repeated again.

In Step S142, the simultaneous operation control unit 212 starts a movement axial system command. Specifically, the movement axial system command includes commands such as homing, an axis movement command, the workpiece coordinate system, and the movement management coordinate system. In Step 3143, the simultaneous operation control unit 212 completes the movement axial system command, and the processing subsequently proceeds to Step S104 of FIG. 11.

Figure 16:
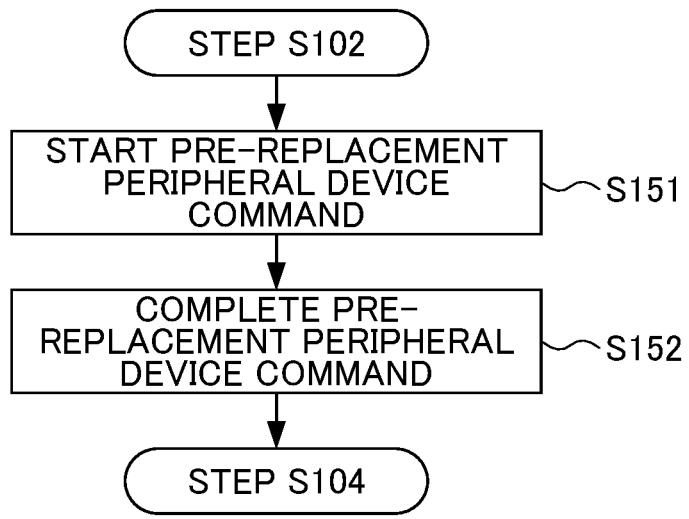
FIG. 16 is a flowchart showing processing regarding a peripheral device.
Figure 17:
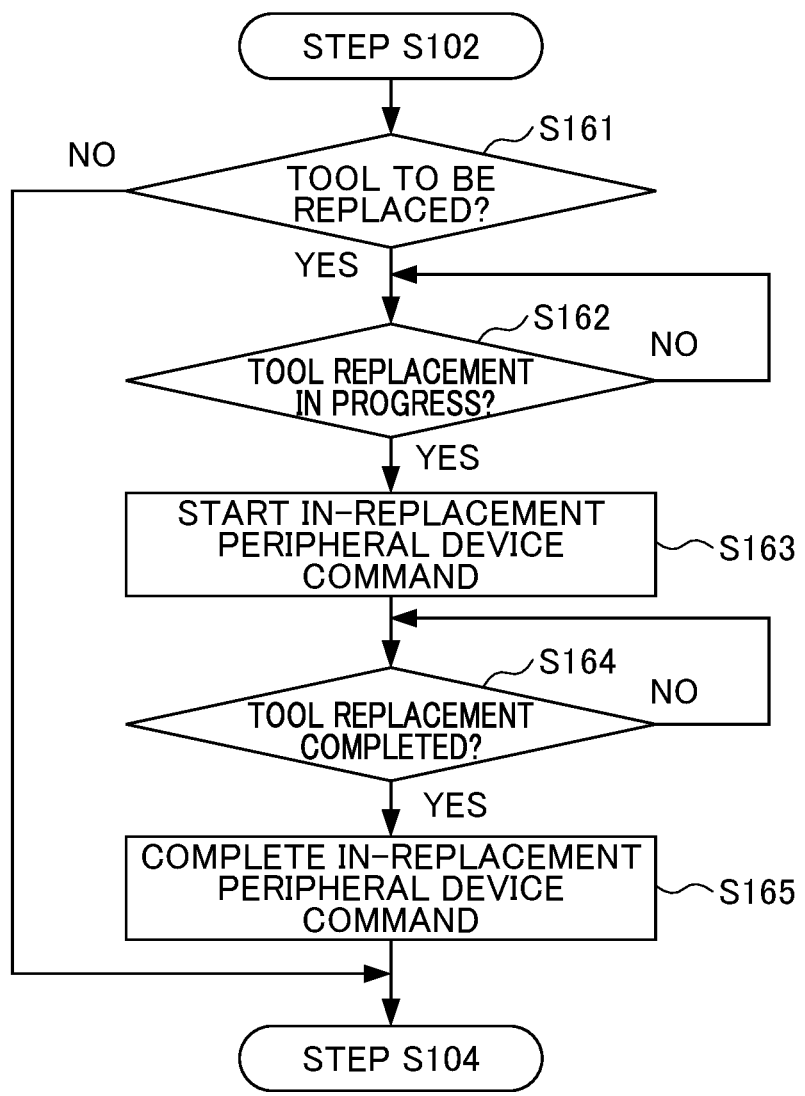
FIG. 17 is a flowchart showing processing regarding a peripheral device.

FIG. 16 is a flowchart showing the processing for a peripheral device. In Step S151 of FIG. 16 after Step S102 of FIG. 11, the simultaneous operation control unit 212 starts a pre-replacement peripheral device command. Specifically, the simultaneous operation control unit 212 starts, as the peripheral device command, processing a cutting fluid OFF command.

In Step S152, the simultaneous operation control unit 212 completes the pre-replacement peripheral device command, and the processing subsequently proceeds to Step S104 of FIG. 11.

FIG. 11 is a flowchart showing the processing for a peripheral device. In Step 3161, the simultaneous operation control unit 212 determines whether or not a tool number of a replacement tool system command has been commanded, thereby determining whether or not tool replacement is to be performed. In a case where the tool number of the replacement tool system command has been commanded (YES), the processing proceeds to Step S162. In a case where the tool number is not commanded (NO), the processing proceeds to Step S104 of FIG. 11.

In Step S162, the simultaneous operation control unit 212 determines, as a peripheral device command, whether or not tool replacement is in progress. In a case where tool replacement is in progress (YES), the processing proceeds to Step S163. In a case where tool replacement is not in progress (NO), the processing in Step S162 is repeated again. In Step S163, the simultaneous operation control unit 212 starts an in-replacement peripheral device command. Specifically, the simultaneous operation control unit 212 starts, as the peripheral device command, processing a tapered surface cleaning command for cleaning the tapered surfaces of the spindle and the tool.

In Step S164, the simultaneous operation control unit 212 determines whether or not tool replacement has been completed. In a case where tool replacement has been completed (YES), the processing proceeds to Step S165. In a case where tool replacement has not been completed (NO), the processing in Step S164 is repeated again.

In Step S165, the simultaneous operation control unit 212 completes the in-replacement peripheral device command, and the processing subsequently proceeds to Step S104 of FIG. 11.

FIG. 18 is a view showing the command classification table for the pre-machining code. As shown in FIG. 18, for a tool system command, an axial system command, and a peripheral device command, codes and command contents are associated with each other. FIG. 19 is a view showing the command classification table for the post-machining code. As shown in FIG. 19, for a tool system command, an axial system command, and a peripheral device command, codes and command contents are associated with each other.

Specifically, in FIGS. 18 and 19, the commands executable simultaneously with tool replacement are classified into three classifications including the tool system command, the axial system command, and the peripheral device command. Each of the tool system command, the axial system command, and the peripheral device command is further classified into classifications including before, after, and during tool replacement and before, after, and during a movement command.

The tool system command includes, for example, G-codes and M-codes regarding rotation of the cutting tool 31 attached to the spindle, tool length correction, the spindle control, and a movement axis parallel with the spindle. The axial system command includes, for example, G-codes and M-codes regarding a movement command for each axis for moving the table 42 on which the workpiece 41 is placed, a rotation axis clamping/unclamping command, correction of the tool diameter of the cutting tool 31. The peripheral device command includes, for example, the cutting fluid control. These commands are stored as the command classification tables in the storage unit (not shown) of the numerical control device 2.

Figure 20:
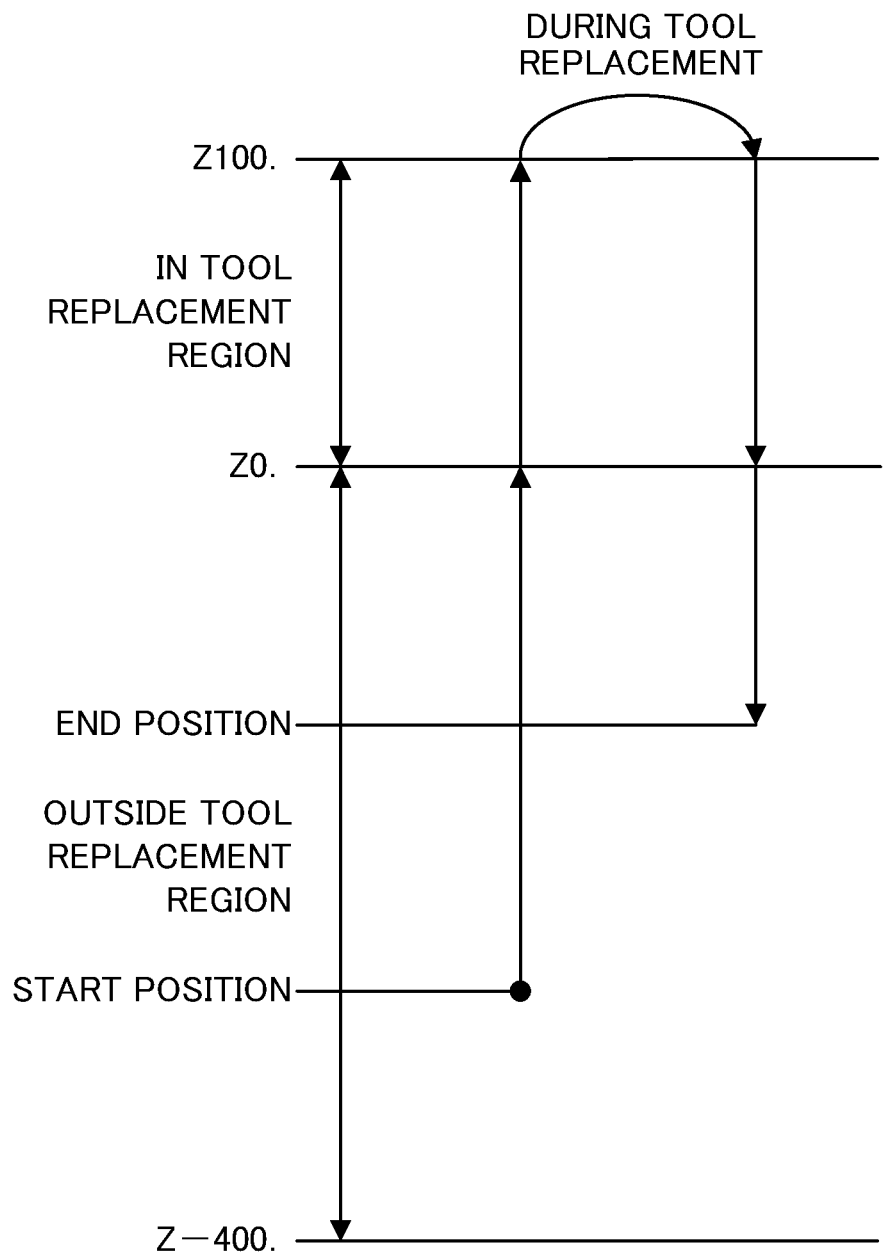
FIG. 20 is an example of tool axis movement according to a certain pre-machining code P11.

FIG. 20 shows an example of tool axis movement according to a certain pre-machining code P11. In the example shown in FIG. 20, the tool axis is the Z-axis, the tool replacement region is from Z100. to Z0, and a Z-axis movement area is Z-400. In this case, a position at which the pre-machining code P11 is commanded outside the tool replacement region is a start position, and the tool axis moves to Z0 within the tool replacement region for tool replacement. Thereafter, the tool axis moves from Z0 within the tool replacement region to Z100. at which tool replacement is to be executed, and thereafter, tool replacement is executed. After tool replacement, the tool axis moves to Z0 within the tool replacement region, and thereafter, the position thereof is set at an end position.

FIG. 21 is an example of tool axis movement according to a certain post-machining code P12. In the example shown in FIG. 21, the tool axis is the Z-axis, the tool replacement region is from Z100. to Z0, and a Z-axis movement area is Z-400. In this case, a position at which the pre-machining code P11 is commanded outside the tool replacement region is a start position, and the tool axis moves to Z0 within the tool replacement region for tool replacement. Then, the tool axis moves from Z0 within the tool replacement region to Z100. at which tool replacement is to be executed, and thereafter, tool replacement is executed. After tool replacement, the tool axis moves to Z0 within the tool replacement region, and thereafter, the position thereof is set at an end position. Note that Z-400. in FIGS. 20 and 21 indicates the limit of the stroke of the tool axis.

In the pre-machining code P11, a G-code is G920, and indicates a pre-machining code for cutting. T indicates replacement of the cutting tool 31, and H indicates a tool correction number. Moreover, G54 indicates a workpiece coordinate system setting, X indicates a movement command in the X-axis direction, Y indicates a movement command in the Y-axis direction, A indicates a movement command in an A-axis direction, and C indicates a movement command in a C-axis direction. Further, Z indicates an approach position in tool length correction, S indicates a spindle rotation number for the spindle control, M03 indicates forward rotation of the spindle, M08 indicates that cutting fluid is turned ON, and M100 indicates pre-movement unclamping of the A- and C-axes and post-movement clamping of the A- and C-axes.

In the post-machining code P12, a G-code is G930, and indicates a post-machining code for cutting. G930 indicates operation of fixed cycle cancellation, tool length and diameter correction cancellation, and homing of the X-axis, the Y-axis, the A-axis, the C-axis, and the Z-axis. Each of X, Y, A, C, and Z indicates the origin of each coordinate axis. Moreover, M05 indicates spindle stop for the spindle control, M09 indicates that cutting fluid is turned OFF, and M101 indicates pre-movement unclamping of the A- and C-axes.

Further, T indicates replacement of the cutting tool 31, and when there is no command, only homing of the Z-axis is performed.

The machine tool 3 shown in FIG. 2 performs the following operation steps (1) to (3), for example.

(1) In tool replacement, the spindle 34 of the machine tool 3 moves up in the Z-axis direction, and the turret 32 turns. In upward movement in the Z-axis direction, i.e., as a command before replacement, the numerical control device 2 executes a pre-replacement tool system command and a pre-replacement peripheral device command. For example, the numerical control device 2 cancels tool length correction, a fixed cycle, etc. simultaneously with upward movement in the Z-axis direction. If the spindle is rotating, the machine tool 3 stops the spindle, and orients and sets the position of the spindle to a tool replacement position. Moreover, a measuring machine such as a touch-trigger probe is attached to the spindle, and if the touch-trigger probe is ON, the touch-trigger probe is turned OFF. Further, the cutting fluid and a peripheral device such as an air blower are turned ON/OFF. In addition, the numerical control device 2 cancels, as a pre-movement axial system command, tool diameter correction and coordinate rotation. Moreover, the numerical control device 2 unclamps the rotation axis if the rotation axis is clamped.

(2) While the turret 32 is rotating, the work table 33 moves in the X-axis direction and the Y-axis direction. Moreover, while the turret 32 is rotating, the numerical control device 2 determines that replacement is in progress. During replacement, tapered surface cleaning is executed according to M26 as a peripheral device command. Further, the numerical control device 2 may check not only a condition while the turret 32 is rotating, but also check whether or not there is an interference.

(3) After tool replacement, the machine tool 3 executes movement of the spindle 34 in the Z-axis direction, the spindle control, the cutting fluid control, rotation axis clamping, etc.

The numerical control device 2 according to the present embodiment uses the above-described machining program so that the steps of performing the simultaneous operation as in the steps (1) to (3) can be executed simultaneously. Thus, the numerical control device 2 uses, for example, codes such as G920 and G930 as described above so that a cycle time can be easily shortened and cutting can be easily performed.

In addition to X, Y, and Z, rotation axis movement commands for, e.g., A, B, and C may be added to the pre-machining code P11 and the post-machining code P12. For example, when commands for the A- and C-axes are made as movement axial system commands in the same block as that for the X-, Y-, and Z-axes, the A- and C-axes move simultaneously with movement of the X- and Y-axes. When M100 or M101 is commanded in the same block, unclamping of M11, M69, and M72 is simultaneously executed as pre-movement axial system commands if the A- and C-axes as the rotation axes are clamped upon upward movement in the Z-axis direction. M100 is executed simultaneously with clamping of M10, M68, and M71 after completion of the movement axial system commands.

At this point, it is not necessary to wait until all pre-movement axial system commands and movement axial system commands are completed. For example, for the pre-movement axial system commands, operation for the X- and Y-axes which are axes unrelated to an unclamping state may be started without waiting for unclamping of the rotation axis. For example, for the post-movement axial system commands, in a case where a direct drive motor operable at high speed is employed and a rotation axis reaches a command position before the X- and Y-axes, operation for the rotation axis may be executed without waiting for the X- and Y-axes to reach the command position.

As described above, according to the present embodiment, the numerical control device 2 includes the machining program analysis unit 211 that analyzes the commands simultaneously executable by the machine tool 3 from the one-line machining program for commanding the machine tool 3 before and after cutting and the simultaneous operation control unit 212 that uses the analyzed simultaneously-executable commands to control the simultaneous operation commanded according to the combination of the commands simultaneously executable by the machine tool 3. With this configuration, the numerical control device 2 can simultaneously command the steps of performing the simultaneous operation. Thus, the numerical control device 2 can shorten the cycle time, and can easily and efficiently execute operation of the machine tool 3.

The steps of performing the simultaneous operation include replacement of the cutting tool 31, tool length and diameter correction for the cutting tool 31, the setting of the workpiece coordinate system, the setting of the movement management coordinate system, movement of the cutting tool 31, the workpiece 41, or the table 42 in the workpiece coordinate system, the spindle rotation control, the cutting fluid control, the air control, and the rotation axis clamping/unclamping control. With this configuration, the numerical control device 2 can simultaneously execute these steps in the machine tool 3.

The machining program includes, as the pre-machining codes before cutting, replacement of the cutting tool 31, the tool correction number for tool length and diameter correction for the cutting tool 31, the setting of the workpiece coordinate system, the setting of the movement management coordinate system, movement of the cutting tool 31 in the coordinate system, the spindle rotation control, and the cutting fluid control. With this configuration, the numerical control device 2 can properly compute and execute the pre-machining code.

The machining program includes, as the post-machining codes after cutting, replacement of the cutting tool 31, homing, the homing axis, the setting of the workpiece coordinate system, the setting of the movement management coordinate system, movement of the cutting tool 31, the workpiece 41, or the table 42 in the workpiece coordinate system, the spindle control, the cutting fluid control, and the air control. With this configuration, the numerical control device 2 can properly compute and execute the post-machining code.

The post-machining codes may include, instead of homing and the homing axis, replacement of the cutting tool 31, the setting of the workpiece coordinate system, and the movement command for the cutting tool 31 and the table 42 in the workpiece coordinate system. With this configuration, the numerical control device 2 can properly compute and execute the post-machining code.

The machining program describes variables, the variables include the command values of replacement of the cutting tool 31, the tool correction number for tool length and diameter correction for the cutting tool 31, the workpiece coordinate system, the movement command for the cutting tool 31 and the table 42 in the workpiece coordinate system, homing, the homing axis, the spindle control, the additional axis control, the cutting fluid control, and the peripheral device control, and the command values are commanded by the one-line machining program. The program invoked by the machining program executes the simultaneous operation of the machine tool 3 by means of the variables. With this configuration, the numerical control device 2 can properly execute the simultaneous operation.

The program invoked by the machining program commands replacement of the cutting tool 31 and movement of the cutting tool 31 and the table 42 in the workpiece coordinate system in the same block.

Thereafter, the invoked program commands the tool correction number for tool length and diameter correction for the cutting tool 31 and tool axis movement, the spindle control, the cutting fluid control, and the peripheral device control in the same block. With this configuration, the numerical control device 2 can properly execute each command.

The embodiment of the present invention has been described above, but the present invention is not limited to the above-described embodiment. The advantageous effects described in the present embodiment have merely been listed as most suitable advantageous effects of the present invention, and the advantageous effects of the present invention are not limited to those described in the present embodiment.

EXPLANATION OF REFERENCE NUMERALS

1 Machining System
2 Numerical Control Device
3 Machine Tool
31 Cutting Tool
32 Turret
33 Work Table
41 Workpiece
42 Table
21 Control Unit
211 Machining Program analysis Unit
212 Simultaneous Operation Control Unit

The invention claimed is:
1. A numerical control device comprising:
a processor configured to:
analyze commands simultaneously executable by a machine tool from a one-line machining program for commanding the machine tool before and after cutting; and
use the analyzed simultaneously-executable commands to control simultaneous operation commanded according to a combination of the commands simultaneously executable by the machine tool,
wherein a step of performing the simultaneous operation includes replacement of a cutting tool of the machine tool, a tool system command before, during, and after the replacement of the cutting tool, an axial system command before, during, and after axis movement, cutting fluid control, additional axis control, and peripheral device control.
2. The numerical control device according to claim 1, wherein the machining program includes, as a pre-machining code before the cutting, the replacement of the cutting tool, a tool correction number for tool length and diameter correction for the cutting tool, a setting of a workpiece coordinate system, a movement command for the cutting tool and a table in the workpiece coordinate system, spindle control, the additional axis control, the cutting fluid control, and the peripheral device control.

3. The numerical control device according to claim 2, wherein the machining program describes a variable, the variable including command values of the replacement of the cutting tool, the tool correction number for the tool length and diameter correction for the cutting tool, the workpiece coordinate system, the movement command for the cutting tool and the table in the workpiece coordinate system, a homing, a homing axis, the spindle control, the additional axis control, the cutting fluid control, and the peripheral device control and the command values being commanded by the one-line machining program, and a program invoked by the machining program executes the simultaneous operation of the machine tool by means of the variable.

4. The numerical control device according to claim 3, wherein the program invoked by the machining program commands the replacement of the cutting tool and movement of the cutting tool and the table in the workpiece coordinate system in an identical block, and thereafter, commands the tool correction number for the tool length and diameter correction for the cutting tool and tool axis movement, the spindle control, the cutting fluid control, and the peripheral device control in an identical block.

5. The numerical control device according to claim 1, wherein the machining program includes, as a post-machining code after the cutting, homing, a homing axis, spindle control, the additional axis control, and the cutting fluid control.

6. The numerical control device according to claim 5, wherein the post-machining code includes, instead of the homing and the homing axis, the replacement of the cutting tool, a setting of a workpiece coordinate system, and a movement command for the cutting tool and a table in the workpiece coordinate system.

7. A method for controlling a numerical control device, comprising:

a step of analyzing commands simultaneously executable by a machine tool from a one-line machining program for commanding the machine tool before and after cutting; and a step of using the analyzed simultaneously-executable commands to control simultaneous operation commanded according to a combination of the commands simultaneously executable by the machine tool, wherein a step of performing the simultaneous operation includes replacement of a cutting tool of the machine tool, a tool system command before, during, and after the replacement of the cutting tool, an axial system command before, during, and after axis movement, cutting fluid control, additional axis control, and peripheral device control.

* * * * *